US006694874B1

(12) United States Patent
Hussain

(10) Patent No.: US 6,694,874 B1
(45) Date of Patent: Feb. 24, 2004

(54) DIGITAL CANCELLATION MARK

(75) Inventor: Khalid Hussain, Gladstone, MO (US)

(73) Assignee: The United States Postal Service, Washington, DC (US)

( * ) Notice: Subject to any disclaimer, the term of this patent is extended or adjusted under 35 U.S.C. 154(b) by 0 days.

(21) Appl. No.: 10/235,136

(22) Filed: Sep. 4, 2002

(51) Int. Cl.[7] ............................ B41L 47/46; B41L 1/02; B41K 45/00; G06F 17/00; G06F 17/60

(52) U.S. Cl. ............................ 101/91; 101/483; 101/71; 235/375; 235/385; 235/838

(58) Field of Search ............................ 101/483, 71, 91; 283/71; 382/112; 235/385, 375; 345/838

(56) References Cited

U.S. PATENT DOCUMENTS

| | | | | | |
|---|---|---|---|---|---|
| 5,018,207 | A | * | 5/1991 | Purdum | 382/112 |
| 5,109,153 | A | | 4/1992 | Johnsen et al. | 235/468 |
| 5,319,562 | A | | 6/1994 | Whitehouse | 705/403 |
| 5,635,694 | A | | 6/1997 | Tuhro | 235/375 |
| 5,873,605 | A | | 2/1999 | Kaplan | 283/71 |
| 5,923,406 | A | | 7/1999 | Brasington et al. | 355/40 |
| 5,988,057 | A | * | 11/1999 | Salomon et al. | 101/91 |
| 6,054,170 | A | * | 4/2000 | Chess et al. | 427/7 |
| 6,112,193 | A | * | 8/2000 | Dlugos et al. | 705/408 |
| 6,175,825 | B1 | * | 1/2001 | Fruechtel | 705/404 |
| 6,300,999 | B1 | * | 10/2001 | Komatsu et al. | 355/44 |
| 6,415,336 | B1 | * | 7/2002 | Sansone | 710/5 |
| 6,427,139 | B1 | * | 7/2002 | Pierce | 705/60 |
| 6,459,953 | B1 | * | 10/2002 | Connelly et al. | 700/224 |
| 6,483,540 | B1 | * | 11/2002 | Akasawa et al. | 348/239 |
| 6,503,329 | B2 | * | 1/2003 | Patton et al. | 118/669 |
| 6,507,361 | B1 | * | 1/2003 | Barber | 348/207.2 |
| 6,532,452 | B1 | * | 3/2003 | Pintsov et al. | 705/401 |
| 6,592,027 | B2 | * | 7/2003 | Kovlakas | 235/375 |
| 6,600,823 | B1 | * | 7/2003 | Hayosh | 380/51 |
| 2002/0017782 | A1 | * | 2/2002 | Patton et al. | 283/71 |
| 2002/0017783 | A1 | * | 2/2002 | Patton et al. | 283/71 |
| 2002/0089172 | A1 | * | 7/2002 | Patton et al. | 283/71 |

FOREIGN PATENT DOCUMENTS

| | | |
|---|---|---|
| EP | 1 022 065 A2 | 7/2000 |

* cited by examiner

*Primary Examiner*—Andrew H. Hirshfeld
*Assistant Examiner*—Wasseem Hamdan
(74) *Attorney, Agent, or Firm*—Ivan J. Mlachak; Lewis and Roca LLP

(57) ABSTRACT

A method is disclosed for providing a pictorial cancellation mark that may be applied to the postage indicia on a mailpiece. The pictorial cancellation originates as a digital image that is then printed through a printer on the mailpiece. This invention takes advantage of the technology now available in digital printing techniques to vary the pictorial cancellation through a variety of color, sizes, shapes, and images. Pictorial cancellations may thus be individualized for markets, applications, and unique purposes.

4 Claims, 4 Drawing Sheets

FIG 3
DIZZY DEAN
Sports--where the fun is!
KANSAS CITY MO 64144
MAY 24 2001
TM USPS

DIGITAL CANCELLATION MARK

FIELD OF THE INVENTION

The present invention relates to a method of printing postal cancellation marks. More specifically the invention is a method of printing cancellation marks in a multitude of colors and patterns. The cancellation marks may be printed on typical postal forms such as letters, envelopes, and packages. The method provides cancellation marks with an aesthetic appearance and a cachet of durability estimated up to 200 years. The method further provides means that allow options in the printing of cancellation marks.

BACKGROUND OF THE INVENTION

Cancellation of a postage stamp historically has been achieved by defacing the stamp. The defacing prevents the re-use of the stamp. This cancellation procedure in the United States has evolved into standard designs. These designs are used throughout the domestic postal system. Typically a cancellation mark consists of round date cancels or killer bar cancels.

With the growth in popularity of the collection of First Day Covers, cancellation techniques further evolved to include pictorials. A First Day Cover (FDC) is typically an envelope or card bearing a stamp that is also cancelled on the first day that the stamp is placed on sale by the Postal Service. The offering of a new stamp may also take place in a single city or location. Thus the application of a cancellation mark on the stamp that reflects the city and date of cancellation adds to the value of the FDC. Typically an FDC also includes graphical or written information known as the cachet. The cachet may, for example, comment on the significance of the subject on the stamp, as when a figure of historical or social importance is displayed on the stamp. The collection of FDCs is a popular hobby activity as it allows the collector to participate in the activity by creating their own covers.

Pictorial cancellations have proven especially popular when applied to FDCs. Typically a pictorial cancellation includes graphical content such as categories or types of artwork or graphical artwork. A pictorial cancellation may relate to the subject of the stamp being cancelled. A common pictorial cancellation may comprise graphical artwork, the date of the stamp issuance, a city, state, and zip code. The selective design of a pictorial, together with its overall appearance can enhance both the stamp and the cachet on the FDC. The pictorial cancellation thus becomes a valued feature or aspect of the FDC.

While pictorial cancellations are especially popular with FDCs, they are also popular in other ways. For example pictorial cancellations can be designed to reflect seasonal times such as Christmas, Valentines Day, and Independence Day. Geographical regions may also include pictorial features such as the Grand Canyon or the Rocky Mountains. In short, pictorial cancellations are a valued feature of the present mail service, and indications are that they will play an important role in further satisfying public expectations of future postal services.

A pictorial cancellation performs a dual function. It cancels or defaces the face of the stamp as do traditional forms of cancellation. At the same time the graphical portion of the mark adds to the aesthetic quality of the item receiving the mark. Thus a pictorial cancellation may enhance the desirability of certain stamps. The pictorial cancellation has proven popular among stamp collectors. And it is expected their popularity among consumers will continue.

The pictorial cancellations in the prior art use apply ink that is applied either by a hub, such as a metal hub, or dies, typically made of rubber. The cancellation may be applied through a machine or automatic process. A hand press or other manual means may also be used to make the impression of the pictorial cancellation. The ink that has been used with pictorial cancellations is black ink.

One drawback to the pictorial cancellations now in use is the time consuming and labor intensive process involved in creating the die. The act of physically creating a die or a hand stamp requires the time and labor of a qualified technician. The cancellation design must first be created and then transferred to a physical medium. Dies must also be affixed to machines in mechanical cancellation modes and/or the hand stamp.

A further drawback to the present use of pictorial cancellations in the limited means by which to apply the cancellation mark. The mark has been applied by manual means or mechanical means. A variety of other printing technologies exist which have not been employed to apply pictorial cancellation marks.

An additional drawback to the present use of pictorial cancellations is the limitation to black ink, or a single color of ink. When applied by a hand stamper or mechanical device, the cancellation is limited to a single color. Typically this color is black.

Still a further drawback to the present use of pictorial cancellations is their inability to scale or adjust in size. Once dies are prepared under the present technology, the size of the cancellation is locked in at the physical dimensions of the die. Thus the present technology cannot provide a pictorial cancellation that enlarges or diminishes—zooms in or out—so as to adjust the size of the cancellation to custom fit the subject being cancelled.

Hence, there is a need for a pictorial cancellation mark that addresses one or more of the above-noted drawbacks. Namely, a pictorial cancellation mark is needed that does not require significant manual input during creation, and/or is not limited in the methods by which the mark may be applied, and/or allows for multiple colors in the graphical image and/or allows for size adjustment of the mark. The present invention addresses one or more of these needs.

SUMMARY OF THE INVENTION

The present invention provides a pictorial cancellation for application on postal articles, such as letters and parcels. To overcome the disadvantages of the current system, and consistent with the present invention, a method of digital cancellation is disclosed. Such digital cancellation is timesaving, results in a clean operation, and offers versatility of instant design creation. The pictorial cancellations of the present method may be altered, adjusted, changed, and varied in dimension and color. The digital pictorial cancellation method allows for unlimited combinations of features that enhance the aesthetic qualities of cancellations such as those applied to a First Day Cover.

Other independent features and advantages of the invention and method will become apparent from the following detailed description, taken in conjunction with the accompanying drawings which illustrate, by way of example, the principles of the invention.

DETAILED DESCRIPTION OF THE PREFERRED EMBODIMENT

Figure 1:
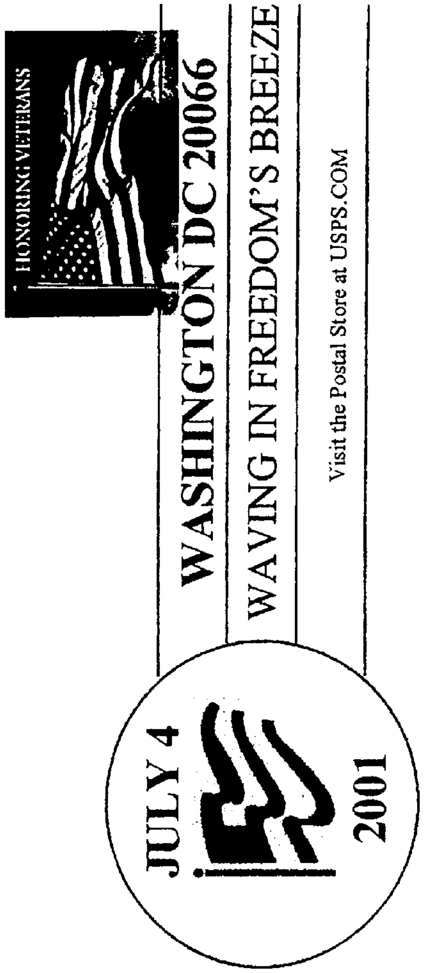
FIG. 1 is one representation of a pictorial cancellation.
Figure 2:
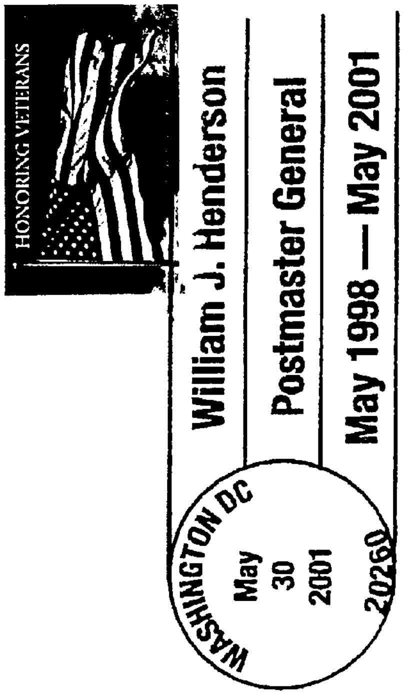
FIG. 2 is another representation of a pictorial cancellation.
Figure 3:
FIG. 3 is a representation of another pictorial cancellation.
Figure 4:
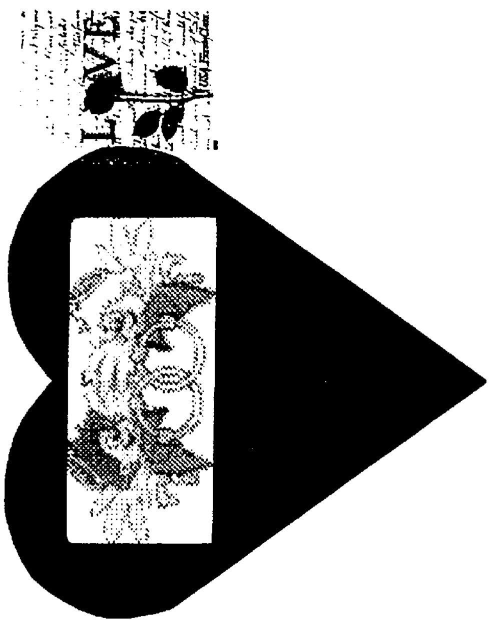
FIG. 4 is another representation of another pictorial cancellation.

Turning now to the description, and with reference first to FIG. 1, a functional schematic block diagram of one embodiment of a digital cancellation mark is shown.

In the present invention artwork and/or graphical material that is to be used in a pictorial cancellation mark is created. Preferably the artwork is created through a software-assisted graphics program. One such program is included in the Adobe Acrobat product. Other acceptable programs are found in the Microsoft suite of graphics applications. By appropriate editing procedures that are known to those skilled in the art, the graphic design may be adjusted for colors, sizes, shape, graphical features, and other criteria.

A physical form of artwork may be put in electronic form. One preferred method to accomplish this is to scan the artwork with a scanner. In this method artwork may be created through traditional graphical means such as by drawing or painting or photographing. The physical image should be scanned, which in this context includes both electronic scanners as well as other electronic equipment sufficient to convert the physical image into electronic, digitized format. Such equipment may include photocopiers and methods of digital photography.

Once an electronic version of the artwork is created, the image itself may be edited through known editing techniques. The image may also be electronically modified as in changing colors or adding graphical material to the original artwork.

It is within the scope of the present invention to create pictorial cancellations that are partially created by one artist and then completed by a customer or some other artist. Thus, for example, a Happy Birthday image may be created to form part of a greeting. The image may include a blank space for the recipient's name. The name may be provided by another such as the customer. The actual inputting of the additional material may be done by the customer himself or herself. In addition a Postal Service agent may enter the information that the customer communicates to the agent.

A next step in the method of the present invention is transmitting the electronic version of the pictorial cancellation mark to a printer. The step of transfer to the printer may take place through several routes. For example, the electronic image may be stored in some form of electronic memory, as for example, on a computer memory, hard drive or other form of memory. From this location, the electronic image may be transferred to a printer. Alternatively, the electronic image may be communicated directly to a printer from some original imaging source. Thus, for example, an electronic image may be transmitted directly from a scanner to a printer. It is recognized that certain communication protocols must be followed in order for electronic data from one source, such as a scanner, digital camera, or computer memory, to be communicated to a printer such that the printer can then print the electronic image. The present invention is not limited to any particular form of electronic linkage, and those known in the art may be used.

In one embodiment of the present invention a graphical image was scanned using a Hewlett Packard ScanJet ADF into a Compaq Deskpro EN PC, and printed using a Hewlett Packard DiskJet 990 Cse.

A further step in the present invention is the printing of the pictorial cancellation on a mailpiece. Any known computer technology that is capable of printing an electronic image may be used. Preferably inkjet printers and laserjet printers may be used. A particular advantage of the present invention is the capability of printing multiple colors in a single printing operation. Thus color printers are also preferred means of printing pictorial cancellations as they allow printing of multiple colors.

Upon command the printer prints the selected pictorial cancellation. The printing may be done in a manner such that the printing cancels a postage indicia on a mailpiece. Preferably the printer is controlled by a computer from which the print commands are transmitted. Further, the image editing functions may also be located on the same computer.

In operation a pictorial cancellation mark is applied in the following method. The customer or Postal agent selects a printer with which to print a pictorial cancellation. The printer is programmed with a graphical imaging program. A pictorial cancellation is selected on a computer platform that controls the printer. Note that invention includes both embodiments in which the computer platform is a computer remote and separate from the printer and the embodiment in which the computer that controls the printing operation is a unitary piece with the printer. The pictorial cancellation is thereupon printed upon the desired mailpiece.

In other embodiments, the application of a pictorial cancellation may also include the selection of a particular pictorial cancellation from among several that are available to the consumer. In this method, various images are first designed. Preferably the images are then created and stored in the digital memory of the computer platform. Images of the optional pictorials are made available to the customer by example in a hard copy brochure or through computer displays of the image, as for example, on a viewing monitor. The customer thereupon selects his preferred image, and it is applied to the selected mailpiece.

In still another embodiment, the user/consumer may design a custom pictorial cancellation. Such a customized design may include features such as color, dimensions, and text messages, among others. The custom design encompasses a spectrum of material contributed by the designer. At one end of the spectrum, the designer may select certain options that are available modifications to a partially predesigned image. For example, a Happy Birthday pictorial design may be created with a blank space for the name of the recipient. The custom design may then include filling in the name. At the other end of the spectrum, the user/consumer may create the entire graphical image.

Graphical software programs are preferably used to create a pictorial cancellation mark. In a preferred embodiment, software marketed under the Adobe Acrobat tradename, has been used to create such marks. However, other software programs may also be used to create the pictorial cancellation, one requirement being that the software program is compatible with the printer to be used.

The application of a digital cancellation in the postal process of stamp cancellation is new and unique; further the use of colors other than black or red, applied by digital process in postage indicia cancellation is new and unique. Digital as used here is an all-encompassing word to include all current printing processes utilizing computer technology and not involving the use of printing presses of any type utilizing metal or rubber impression dies.

The use of software, scanning equipment, computers, and digital printers to apply cancellations improves upon the present technology be eliminating 1) the necessity of loading presses with oil based inks, 2) adjusting ink levels across large printing areas, 3) adjusting for evenness of ink on cancellation, 4) the need of constant attention to presses by operators, 5) the necessity for the ink to dry, 6) limiting the use of color to one color per cancellation.

The use of digital cancellation may be applied to specific markets. Thus each cancellation mark may be tailor made to satisfy evaluative criteria of a distinct marketing segment.

FIGS. 1, 2, 3, and 4 illustrate the variability the present invention offers. The figures are examples of pictorial cancellations. The pictorials themselves are composed of multiple colors, as for example, the three colors of the American flag. The content of the pictorial may also be adapted to unique events such as Valentines Day or sporting events.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method of providing a customized cancellation mark to a mailpiece comprising the steps of:

Providing a partially-designed pictorial cancellation mark;

Adding customer-supplied information to the pictorial cancellation mark so as to create a customized cancellation mark; and Printing said customized cancellation mark on postage indicia of the mailpiece to indicate that the postage indicia has been canceled.

2. The method of claim 1 wherein said customer-supplied information comprises numeric or text data.

3. The method of claim 1 wherein said customer-supplied information comprises color selection data.

4. The method of claim 1 further comprising the step of allowing a customer to select the partial design.

* * * * *